Sept. 24, 1963 J. O. VITALE 3,104,540
TEST APPARATUS FOR A FLUID PRESSURE RESPONSIVE INSTRUMENT
Filed Feb. 1, 1960 2 Sheets-Sheet 1

FIG. 1

INVENTOR.
JOSEPH O. VITALE
BY Herbert L. Davis
ATTORNEY

Sept. 24, 1963           J. O. VITALE           3,104,540
TEST APPARATUS FOR A FLUID PRESSURE RESPONSIVE INSTRUMENT
Filed Feb. 1, 1960           2 Sheets-Sheet 2

INVENTOR.
JOSEPH O. VITALE
BY
*Herbert L. Davis*
ATTORNEY

United States Patent Office 3,104,540
Patented Sept. 24, 1963

3,104,540
TEST APPARATUS FOR A FLUID PRESSURE
RESPONSIVE INSTRUMENT
Joseph O. Vitale, Wayne, N.J., assignor to The Bendix
Corporation, a corporation of Delaware
Filed Feb. 1, 1960, Ser. No. 5,843
9 Claims. (Cl. 73—4)

The invention relates to improvements in a test apparatus and more particularly to a test apparatus for a fluid pressure responsive instrument in which there is provided novel means to regulate the application of positive and negative fluid pressures to an output fluid conduit leading to the instrument under test so as to simulate selected atmospheric pressure conditions encountered in aircraft maneuvers at varying altitudes or air speed conditions.

An object of the invention is to provide in such a test apparatus a novel multivalve relay operated control system to regulate the application of positive and negative fluid pressures to a fluid conduit leading to the apparatus under test so as to simulate selected atmospheric pressure conditions encountered at varying altitudes or air speed conditions during maneuvers of an aircraft.

Another object of the invention is to provide in such a test apparatus a novel relay control arrangement for selectively effecting the operation of a multitude of control valves so as to regulate the application of negative and positive fluid pressures to an instrument under test.

Another object of the invention is to provide in the aforenoted arrangement a multivalve relay control system brought into operation by a time delay relay upon apredetermined lapse of time after initiation of operation of the system and upon the sensed pressure condition of the regulated fluid pressure overshooting a preselected pressure value to thereupon cause a predetermined sequence of operation of the relay controlled valves for a more accurate control of the pressure applied to the instrument under test.

Another object of the invention is to provide in the multivalve relay operated control system a time delay relay cooperating with a servomotor means responsive to the regulated pressure so as to effect the selective operation of the respective solenoid operated valves through the aforenoted control system.

These and other objects and features of the invention are pointed out in the following description in terms of the embodiment thereof which is shown in the accompanying drawings. It is to be understood, however, that the drawings are not a definition of the limits of the invention, reference being had to the appended claims for this purpose.

Referring to the drawings:

FIGURE 1 is a schematic drawing of the test apparatus, including a servo pressure sensor and relay control system operated thereby through a pressure control switch mechanism so as to effect selective operation of a multivalve pressure regulator for application of positive and negative fluid pressures to an instrument under test.

Figure 2:
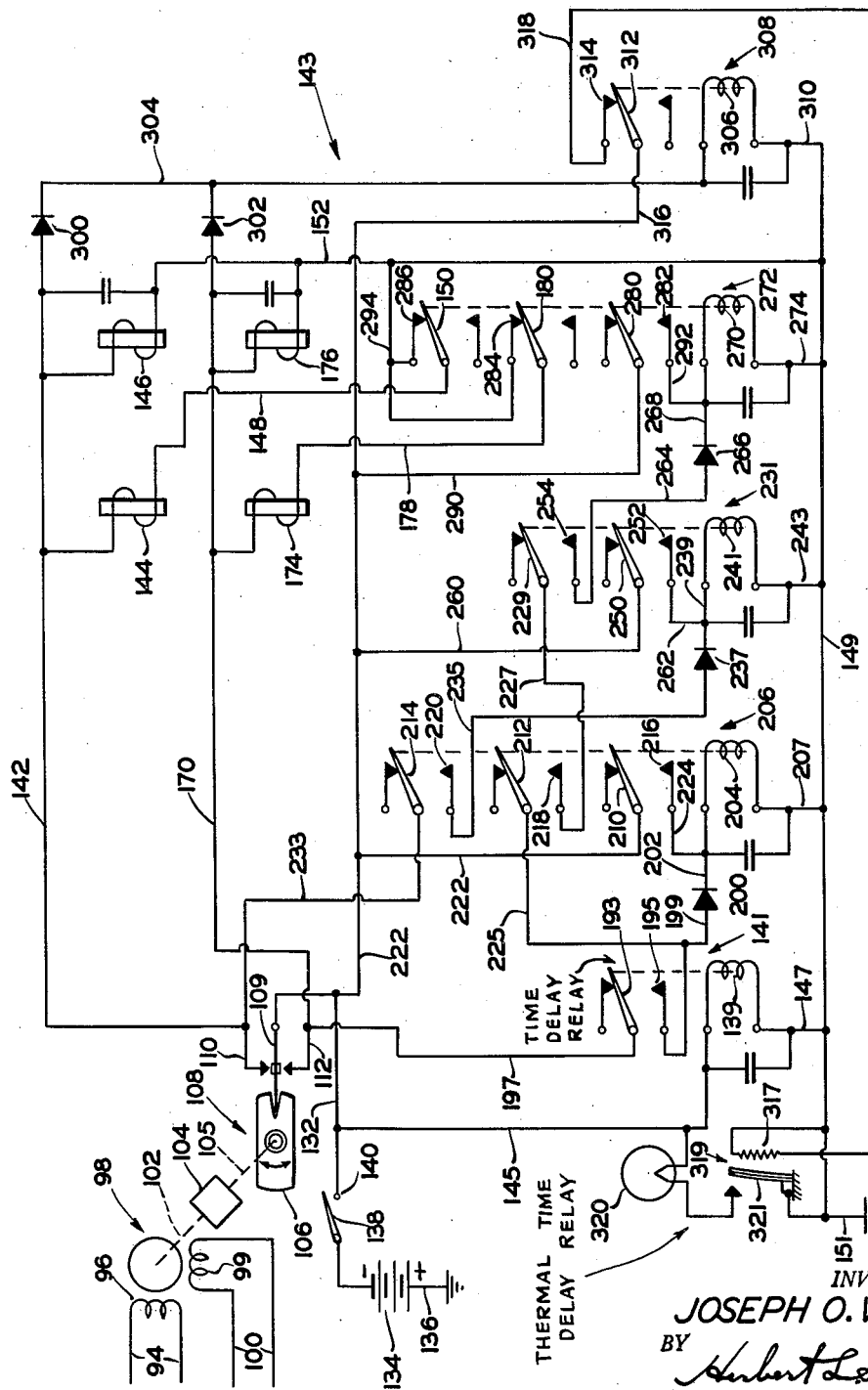
FIGURE 2 is a detailed wiring diagram of the relay control system.

Referring to the drawing of FIGURE 1, there is indicated by the numeral 3 an operator-operative pressure selector having a pointer 4 cooperating with suitable indicia 5 to indicate a selected pressure condition and rotatably connected through a shaft 7 to an adjustable arm 9 cooperating with a variable resistor element 11 forming one leg of a bridge circuit 15. The opposite leg of the bridge circuit 15 is provided by a variable resistor 17 controlled by a second adjustable arm 19, as hereinafter explained.

Connected across the bridge circuit 15 by conductors 21 is a suitable source of alternating current 23. Further output conductors 25 and 27 are electrically connected from the respective arms 9 and 19 across a primary winding 29 of an induction transformer 31 having a secondary winding 33 connected through conductors 35 to the input of an amplifier 37. The amplifier 37 has output conductors 39 leading to a control winding 41 of a two-phase servomotor 43 of conventional type having a fixed phase winding 45 connected through electrical conductors 47 to the source of alternating current 23.

The servomotor 43 drives through suitable gearing 49 and shaft 51 the arm 19 so that upon the bridge circuit 15 being unbalanced by adjustment of the arm 9 relative to the arm 19, the unbalanced signal applied across the induction transformer 31 and to the control winding 41 of the servomotor 43 will cause the motor 43 to drive the arm 19 in a direction to rebalance the bridge circuit 15 and effect a null output signal when the bridge 15 reaches a balanced condition to terminate operation of the motor 43 in conventional manner.

*Servo Pressure Sensor*

As shown in FIGURE 1, the adjustment of the motor 43 to rebalance the bridge circuit 15 will also drive through a suitable reduction gearing 53 a shaft 55, rotatably mounted in sealing relation in a wall of a pressure chamber or casing 57 of a pressure sensor indicated generally by the numeral 59. The shaft 55 is operatively connected within the pressure sensor 59 to one element 61 of an E pick-off transformer indicated generally by the numeral 63 and including, as shown in FIGURE 1, a second adjustable element or soft iron vane 65 connected by a rocking arm 67 pivoted at 69 within the sealed pressure chamber 57 of the pressure sensor 59, as shown in FIGURE 1.

The element 61 of the E pick-off transformer 63 includes an exciting winding 73 on a central leg portion thereof and operably connected through electrical conductors 74 to the source of electrical energy 23. Windings 75 and 77 on opposite outer legs of the E pick-off element 61 are inductively coupled to the exciting winding 73 through the adjustable soft iron vane 65. The inductive coupling relationship thereof may be varied in a conventional manner by adjustment of the relationship between the adjustable element 61 and the adjustable soft iron vane 65.

Opening into the pressure chamber 57 is a fluid pressure conduit 81 and mounted within the pressure chamber 57 is a diaphragm assembly or aneroid 83 fixed at one end 85 to the inner surface of the chamber 57 and having a link 87 at the opposite end operatively connected to the rocking arm 67 so as to adjustably vary the position of the soft iron vane 65 with changes in the fluid pressure within the chamber 57, as sensed by the aneroid 83.

The aneroid 83 serves to adjustably position the soft iron vane 65 through the link 87 and rocking arm 67 so as to give a general motion approximately linear with the pressure altitude in the chamber 57. Since the aneroid 83 is so arranged as to give a motion which is approximately linear with the altitude pressure, the E pick-off windings 75 and 77 inductively coupled to the exciting winding 73 produce a phase sensitive voltage signal across output lines 90 thereof leading to an amplifier 92 and proportional to the angle between the element 61 of the E pick-off transformer 63 and the vane 65.

The voltage signal is in turn applied through output lines 94 of the amplifier 92 to a control winding 96 of a two-phase servomotor 98 of conventional type and having a fixed phase winding 99 connected through conductors 100 to the source of alternating current 23. The signal applied to the control winding 96 effects operation of the servomotor 98 so as to in turn cause a change, as hereinafter explained, in the regulated fluid pressure acting on the aneroid 83 in a sense to attain the pressure condition selected by the operator-operative knob 3.

Thus, in the aforenoted arrangement, an adjustment of the element 61 of the E pick-off transformer 63 by the motor 43 is in effect followed by an adjustment of the vane 65 in response to the resulting change in the regulated fluid pressure acting on the aneroid 83 so as to tend to zero the output voltage across the output lines 90 of the E pick-off 63 to terminate the pressure controlling operation of the motor 98.

*Pressure Control Switch Mechanism*

The servomotor 98 in response to energization of the control winding 96 by the aforenoted signal drives through a shaft 102, reduction gearing 104 and a shaft 105 an actuating arm 106 of a pressure control switch mechanism 108 and in a direction dependent upon the sense of the error signal applied across the lines 94 to the control winding 96.

Thus, upon an error signal being effected across the lines 94 indicative of a fluid pressure within the casing 57 less than that for which the sensor 59 has been set by the motor 43 and calling for an increase in the sensed pressure, the arm 106 is rotated by motor 98 in one sense, for example, a counterclockwise direction, causing a leaf spring switch contact arm 109 to be actuated by the arm 106 so as to selectively close a switch contact arm 110.

Similarly, upon an error signal being applied across the lines 94 of an opposite phase indicative of a fluid pressure within the casing 57 greater than that for which the sensor 59 has been set by the motor 43 and calling for a decrease in the sensed pressure, the arm 106 is rotated by the motor 98 in an opposite sense or clockwise direction causing the leaf spring switch contact arm 109 to be actuated by the arm 106 so as to selectively close a second spring switch contact arm 112.

Upon the sensed pressure within the chamber 57 being equal to that selected by the motor 43 in positioning the E pick-off element 61, the vane 65 is positioned by aneroid 83 in response to the sensed or regulated pressure into a balanced relation with respect to the E pick-off element 61 so that no error signal is applied across the output lines 94 to control winding 96 of the servomotor 98. Thereupon an end of the leaf spring switch arm 109 cooperates in a notch 114 provided in one end of the actuating arm 106 so as to bias the actuating arm 106 to an intermediate position in which the leaf spring switch arm 109 returns to a neutral position, as shown in FIGURE 1, and out of contacting relation with the switch contact arm 110 and the switch contact arm 112.

As shown in FIGURE 1, the actuating arm 106 is pivotally mounted on a base plate 116 by the shaft 105 and there is further provided a limit bar 118 fastened to the base plate 116 in spaced relation to the actuating arm 106 so as to limit the rotary movement by the shaft 105 of the actuating arm 106 in the clockwise and counterclockwise directions.

Further, projecting from the base plate 116 is a bracket arm 119 fastened thereto and supporting suitable electrical insulation members 120 between which are mounted in spaced relation the spring switch contact arms 110 and 112 and intermediate thereto the leaf spring switch contact arm 109, as shown in FIGURE 1. The leaf spring switch contact arm 109, as heretofore explained, cooperates at its free end in the notch 114 provided in one end of the actuating arm 106 while there is connected at the opposite end of the arm 106 through linkage 122 a dash pot 124 having a piston element 126 slidably mounted in cooperative relation in a cylinder 128. The piston 126 is connected through a rod 130 to the linkage 122 so as to retard adjustment of the actuating arm 106 in the clockwise and counterclockwise direction and cooperating with the biasing force of the leaf spring switch contact arm 109 to retard adjustment of the actuating arm 106 from the intermediate or neutral position shown in FIGURE 1.

*Multivalve Pressure Regulator*

Referring now to the wiring diagram of FIGURE 2, it will be seen that the leaf spring contact switch arm 109 is connected by a conductor 132 to a negative terminal of a battery or other suitable source of direct current 134, while the opposite or positive terminal of the battery 134 may be grounded at 136. In controlling the electrical connection through the conductor 132, there is provided a suitable operator-operative switch 138 cooperating with a switch contact 140 to control the connection of the battery 134 to the conductor 132.

Upon the switch 138 closing the contact 140 the control switch mechanism 108 is in an operative condition and there is initiated operation of a time delay relay 141 having a relay winding 139 connected at one end through a conductor 145 to the conductor 132 and at the opposite end through a conductor 147 to a conductor 149 grounded at 151. The purpose of the time delay relay 141 will be explained hereinafter.

Furthermore, upon the contact arm 109 being actuated by the arm 106 so as to close contact arm 110 an electrical circuit, shown in FIGURE 2, is effective through a conductor 142 leading from the contact arm 110 to the relay control system 143 of FIGURE 1 for selectively energizing windings of solenoids 144 and 146 of the multivalve pressure regulator 147. In the aforenoted circuit one end of each of the windings 144 and 146 are connected to the conductor 142 while an opposite end of the winding 144 is connected through a conductor 148 and a normally closed relay switch 150 to a conductor 152 leading through the conductor 149 to the grounded connection at 151, while the opposite end of the winding 146 is connected directly to the grounded conductor 152.

As shown in FIGURE 1, energization of the windings 144 and 146 serves to actuate respectively a valve 155 to open a relatively large bleed orifice of, for example, .014 of an inch in diameter and a valve 156 to open a relatively small bleed orifice of, for example, .004 of an inch in diameter. Upon the windings 144 and 146 being deenergized the respective bleed valves 155 and 156 selectively controlled thereby are biased by suitable spring means not shown to closed positions.

There is provided a conduit 160 for supplying a gaseous medium at greater than atmospheric pressure from a suitable device, such as a pressure pump or storage bottle not shown, for providing super atmospheric pressure of, for example, 150 inches of mercury. The initial opening of the bleed valves 155 and 156 serves to apply a sudden application of positive pressure from the fluid pressure conduit 160 through the fluid conduit 81 to the interior of the chamber 57 of the pressure sensor 59 and through a fluid pressure conduit 162 leading from the conduit 81 to the casing of an instrument under test or to a chamber within which the instrument may be placed for test and indicated in FIGURE 1 by the numeral 165.

The sudden application of pressure to the interior of the casing 57 of the pressure sensor 59 may cause the sensitive diaphragm assembly or aneroid 83 to oscillate so as to cause the servomotor 98 controlled thereby to actuate the arm 106 in an opposite sense causing the leaf spring switch contact arm 109 to open switch contact 110 to deenergize the windings of the solenoids 144 and 146 while closing the switch contact 112.

Upon the contact arm 109 being actuated by the arm 106 upon initial operation or thereafter so as to close contact arm 112, an electrical circuit, shown in FIGURE 2, is effective through a conductor 170 leading from the contact arm 112 to the relay control system 143 of FIGURE 1 for selectively energizing windings of solenoids 174 and 176 of the multivalve pressure regulator 147. In the aforenoted circuit one end of each of the windings 174 and 176 are connected to the conductor 170 while an opposite end of the winding 174 is connected through a conductor 178 and a normally closed relay switch 180 to the conductor 152 leading through the conductor 149 to the grounded connection at 151, while the opposite end of the winding 176 is connected directly to the grounded conductor 152.

As shown in FIGURE 2, energization of the windings of the solenoids 174 and 176 serve to actuate respectively a valve 185 to open a relatively large bleed orifice of, for example, .014 of an inch in diameter and a bleed valve 186 to open a relatively small bleed orifice of, for example, .004 of an inch in diameter. Further, upon the windings of the solenoids 174 and 176 being deenergized the respective bleed valves 185 and 186 selectively controlled thereby are biased by suitable spring means, not shown, to closed positions. There is further provided a conduit 190 for supplying a negative fluid pressure from a suitable device, such as a vacuum pump not shown, for providing a vacuum or sub-atmospheric pressure of, for example, .1 inch of mercury. The actuation of the bleed valves 185 and 186 to the open position serves to apply negative pressure from the vacuum or negative fluid pressure supply conduit 190 through the fluid conduit 81 to the interior of the chamber of the pressure sensor 59 and through a fluid pressure conduit 162 leading to the conduit 81 from the casing or chamber 165.

The initial application of the negative pressure to the interior of the casing 57 of the pressure sensor 59 may in turn cause the sensitive aneroid or diaphragm 83 to oscillate so as to cause the servomotor 98 controlled thereby to once again actuate the arm 106 in an opposite sense causing the leaf spring switch contact arm 109 to open switch contact 112 to deenergize the solenoid windings 174 and 176 while closing the switch contact 110 to repeat the aforedescribed operations.

In order to prevent the aforedescribed oscillatory movement of the aneroid 83 from adversely effecting the operation of the relay control system 143, there is provided, as shown in FIGURE 2, a time delay relay 141 having the relay winding 139 connected at one end through the conductor 145 to the conductor 132 and the opposite end of the winding 139 connected through the conductor 147 to the grounded conductor 149 so that upon the switch 138 being initially closed to start the operation of the control system, the time delay relay winding 139 is energized and after a predetermined delay period of, for example, approximately ten seconds, sufficient to expend the oscillatory movement of the aneroid 83 due to the initial application of the controlled pressures thereto, the relay winding 139 becomes effective to actuate the relay switch arm 193 from a normally open position to a position closing a cooperating relay switch contact 195.

The relay switch arm 193 is connected by an electrical conductor 197 to the electrical conductor 170 controlled by the spring switch arm 112 while the electrical contact 195 is connected by an electrical conductor 199 through a rectifier 200 and conductor 202 to one end of a relay winding 204 of a relay mechanism 206. The opposite end of the relay winding 204 is connected by a conductor 207 to the grounded conductor 149. Thus upon the time delay relay 141 rendering the relay switch 193 effective to close the contact 195 after the elapse of the aforenoted time delay period following closure of the switch 138, the relay winding 204 will be effectively energized upon the contact switch arm 109 closing the switch arm 112.

The relay winding 204 is in turn arranged to operatively control the relay switch arms 210, 212 and 214. These arms 210, 212 and 214 are normally biased to open circuit positions by suitable spring means not shown and are arranged to cooperate respectively with relay switch contacts 216, 218 and 220 upon energization of the relay winding 204 so as to effectively actuate the relay switch arms 210, 212 and 214 to close the respective switch contacts 216, 218 and 220. The relay switch arm 210 is connected by an electrical conductor 222 leading through the conductor 132 to the negative side of the battery 134, while the relay contact 216 is connected through a conductor 224 to the conductor 202 so as to provide a holding circuit for the relay winding 204 upon the switch arm 210 closing the relay contact 216 on energization of the relay winding 204.

The relay switch arm 212 is connected by an electrical conductor 225 to the conductor 199 while the cooperating relay switch contact 218 is connected by an electrical conductor 227 to a relay switch arm 229 of a second relay 231 for a purpose to be described hereinafter. Further, the relay switch arm 214 is connected by an electrical conductor 233 to the conductor 142 leading from the spring switch contact arm 110, while the cooperating relay switch contact 220 is in turn connected through a conductor 235, rectifier 237 and an electrical conductor 239 to one end of the relay winding 241 of the relay 231. The opposite end of the relay winding 241 is connected by a conductor 243 to the grounded conductor 149.

In the aforenoted arrangement, it will be seen that upon the energization of the relay winding 204 the respective relay switch arms 210, 212 and 214 will be biased to positions closing the respective cooperating relay contacts 216, 218 and 220. While the relay switch arm 214 will thereupon close the relay contact 220, it will be seen that energization of the relay winding 241 of the relay 231 will not be effected until the control arm 106 has been actuated by motor 98 so as to move the leaf spring switch contact arm 109 in an upward direction out of contacting relation with the spring contact 112 and into contacting relation with the spring contact 110 so as to render effective a circuit through the conductors 142, 233, relay switch arm 214, relay contact 220, conductor 235, rectifier 237 and conductor 239 for energizing the relay winding 241.

The relay winding 241 is in turn arranged to control relay switch arms 250 and 229 cooperating respectively with relay switch contacts 252 and 254. The relay switch arms 250 and 229 are normally biased to circuit open positions by spring means, not shown, and upon energization of the relay winding 241 are actuated to positions to close the respective relay switch contacts 252 and 254.

The relay switch arm 250 is connected by an electrical conductor 260 to the conductor 222 while the relay switch contact 252 is connected by a conductor 262 to the conductor 239 so as to provide upon the relay switch arm 250 closing the switch contact 252 a holding circuit for the relay winding 241. The relay switch contact 254 is connected by a conductor 264, rectifier 266 and conductor 268 to one end of a relay winding 270 of relay mechanism 272. The opposite end of the relay winding 270 is connected by a conductor 274 to the grounded electrical conductor 149.

It will be seen from the aforenoted arrangement that upon the relay switch arm 229 closing the relay contact 254 upon energization of the relay winding 241 by the switch arm 109 closing the switch contact 110, energization of the relay winding 270 will not be effected until the leaf spring contact arm 109 has been once again actuated in a downward direction by the motor 98 through the control arm 106 so as to close the spring contact 112 to render effective a circuit through the conductors 170, 197, relay switch arm 193, relay contact 195, conductor 199, conductor 225, relay switch arm 212, contact 218, conductor 227, relay switch arm 229, relay contact 254, conductor 264, rectifier 266 and conductor 268 for energizing the relay winding 270.

The relay winding 270 of the relay 272 is arranged to control relay switch arms 280, 180 and 150. The relay switch arm 280 is arranged to cooperate with a relay contact 282 and is normally biased to a circuit open position by spring means not shown. The relay switch arm 180 is normally biased by suitable spring means, not shown, to a position closing a cooperating relay contact 284 while the relay switch arm 150 is normally biased by such spring means to a position normally closing the relay switch contact 286.

Upon energization of the relay winding 270 the relay switch arm 280 is biased thereby to a position closing the relay contact 282, while the relay switch arms 180 and 150 are biased by the energized relay winding 270 to positions opening the respective relay contacts 284 and 286.

The relay switch arm 280 is connected by an electrical conductor 290 to the conductor 222 while the cooperating relay contact 282 is connected by a conductor 292 to the conductor 268 so as to provide upon the relay switch arm 280 closing the relay contact 282 a holding circuit for the relay winding 270. The relay contacts 284 and 286 are in turn electrically connected through an electrical conductor 294 to the grounded conductor 152.

As heretofore explained, the relay switch arm 150 is connected by the electrical conductor 148 to the winding of the solenoid 144, while the relay switch arm 180 is connected by the electrical conductor 178 to the winding of the solenoid 174. Thus, upon energization of the relay winding 270 the relay switch arms 180 and 150 are biased thereby so as to open the respective relay contacts 284 and 286 and thereby the energizing circuits for the respective windings of the solenoids 144 and 174. The relay switch arms 180 and 150 are held in the open position by the energized relay winding 270 so as to prevent effective energization of the solenoid windings 144 and 174 during the remainder of the operation of the control system.

Thereafter, regulation of the fluid pressure medium applied through the fluid pressure conduit 81 is effected solely by the regulatory operation of the small bleed valves 156 and 186 by the selective energization and deenergization of their respective control solenoids 146 and 176.

Selected Pressure Indicator Light

In the aforenoted regulatory operation, the electrical conductors 142 and 170 are connected through rectifiers 300 and 302 respectively to a line 304 electrically connected to one end of a relay control winding 306 of the relay mechanism 308. The opposite end of the relay winding 306 is connected by an electrical conductor 310 to the grounded conductor 149.

The relay winding 306 controls a relay switch arm 312 normally biased by spring means, not shown, to a position closing a relay switch contact 314. The relay switch arm 312 is connected by an electrical conductor 316 to the conductor 132, while the relay contact 314 is connected by an electrical conductor 318 to a resistance heater element 317 of a thermal time delay relay 319 for controlling the operation of a bimetallic switch 321 and thereby an electrical indicator light 320 connected to the electrical conductor 145 and through the switch 321 to a grounded electrical conductor 151. Upon energization of the relay winding 306 the relay switch arm 312 is biased to a circuit open position to render ineffective the heater element 317 of the thermal relay 319 and thereby cause the bimetallic switch 321 to maintain the indicator light 320 deenergized.

It will be seen from the aforenoted arrangement that so long as the control system is regulated to the preselected pressure value and the control is operating about this selected pressure value, power will be applied to the line 142 or the line 170 and thereby through the rectifiers 300 and 302 respectively to the line 304 tending to maintain the relay winding 306 in an energized condition holding the relay switch arm 312 in its open position.

However, upon the regulated pressure reaching a stable selected value at which the relay switch contact arm 109 will be held in a neutral position relative to the spring contact arms 110 and 112, deenergization of the relay winding 306 will then result, causing the relay switch arm 312 to be biased into a position closing the relay contact 314 whereupon the resistance heater element 317 of the thermal relay 319 is energized and effective after a predetermined delay period to cause the bimetallic switch element 321 to close the circuit for the indicator light 320 to energize the light 320 so as to indicate thereby to the operator that the selected pressure has been attained.

Operation

The invention is concerned with a multivalve control system used to regulate a given air pressure or vacuum with an accuracy of, for example, approximately .010 Hg and to effect pressures applied to an instrument under test at 165 simulating conditions which may be detected by an instrument such as an air data computer.

The multivalve control system, as illustrated in FIGURE 1, is applied to a dual servo system in which a command signal effected through operation of the manual pressure selector 3 and bridge 15 causes servomotor 43 to adjust the element 61 of the E pick-off transformer 63 to the desired selected pressure position. Thereupon the pressure sensor 59 operates through the servomotor 98 to position the pressure control switch mechanism 108 so as to selectively operate through the relay control system 143 the several positive and negative pressure control valves 155—156 and 185—186 of the multivalve pressure regulator 147 so as to meter and correct the pressure of the fluid pressure medium applied through the fluid pressure conduit 81 to the aneroid or diaphragm assembly 83 so as to position the vane 65 relative to the element 61 of the E pick-off transformer 63 to obtain a zero signal across the output lines 90 of the pressure sensor 59 upon the selected pressure being attained. Upon the selected pressure condition being attained the light 320 will be energized so as to indicate such condition. Thereafter the instrument under test at 165 may be suitably tested under such selected pressure condition and upon completion of the test the operator-operative switch 138 may be opened.

Further to obtain a different pressure for subsequent test of the instrument the pressure selector knob 3 may be adjusted so as to select the next desired pressure value whereupon the pressure setting of the sensor 59 will be changed to the selected value by the servomotor 43 and the pressure sensor 59 will apply a signal voltage to the control winding 96 of the servomotor 98 of a phase and magnitude dependent upon the sense and magnitude of the difference between the newly selected pressure and the prevailing pressure in the chamber 57.

This error signal causes the servomotor to rotate in a direction dependent upon the phase of the error signal and to cause the leaf spring contact arm 109 to selectively close the spring contact arm 110 upon a counterclockwise rotation of the arm 106 from the intermediate or neutral position and the spring contact 112 upon a clockwise rotation of the arm 106 from the neutral position.

Upon the operator-operative switch 138 being first closed to initiate the operation of the system, the positioning of the arm 106 in the counterclockwise direction will close the contact arms 109 and 110 so as to effect energization of the solenoid windings 144 and 146 causing valves 155 and 156 to open so as to direct positive fluid pressure to the interior of the pressure sensor 59 which in turn acts on the diaphragm assembly of aneroid 83. Similarly the positioning of the arm 106 in the clockwise direction would cause the contact arms 109 and 112 to close so as to effect, upon the operator-operative switch 138 being first closed, the energization of the solenoid windings 174 and 176 causing the valves 185 and 186 to open so to direct negative fluid pressure to the interior of the pressure sensor 59 which in turn acts on the aneroid 83.

In either case a sudden application of pressure to the sensitive diaphragm assembly or aneroid 83 may cause the aneroid 83 to so oscillate as to cause the heretofore described relays 206, 231 and 272 to prematurely perform their function were it not for the action of the time delay relay 141. The time delay relay 141 upon initiation of operation of the control system by the operator closing the switch 138 serves to provide a time delay period within which the relays 206, 231 and 272 may not be brought into operation. The time delay period of the relay 141 may, of course, be varied to suit a range of different speeds of operation. However, with the pressure regulating openings used by the multivalves 155—156 and 185—186, it has been found that a delay period of approximately ten seconds is adequate.

The delay period provided by the relay 141 is so set as to permit the oscillations of the diaphragm assembly or aneroid 83 to be sufficiently dampened that upon the delay period elapsing and the relay 141 actuating the relay switch arm 193 so as to close contact 195, a gradual expansion or contraction of the aneroid 83 is in progress, as the case may be, due to the fluid pressure applied to the aneroid 83 while the signal voltage applied across the output lines 90 of the pressure sensor 59 is gradually decreasing as the fluid pressure within the chamber 57 approaches the selected value.

After the delay period has elapsed and the relay 141 has actuated the switch arm 193 so as to close contact 195, upon a null signal being applied by the pressure sensor 59 to the control winding 96 of the servomotor 98 the motor will release its torque on the arm 106 whereupon the leaf spring contact arm 109 will return the arm to the off or neutral position. However, since this mechanical action cannot be accomplished with the speed of the electrical signal and due to the large valve openings provided by the respective valves 155 and 185 somewhat more than the required positive or negative pressure, as the case may be, is permitted to enter the chamber 57 causing the aneriod 83 and thereby the pressure sensor 59 to overshoot so that an error signal is applied to the control winding 96 of the servomotor 98 of a phase one hundred and eighty degrees away from the immediately preceeding error signal. This last applied error signal will then cause the motor 98 to rotate in an opposite direction in an effort to correct for the previous overshoot.

Upon the motor 98 rotating the control arm 106 in a clockwise direction to correct for such a pressure overshoot and causing the contact arm 109 to close the contact arm 112, after the time delay relay 141 has closed the relay contacts 193, 195, it will be seen that a D.C. current will be directed through contact arms 109 and 112, electrical conductors 170 and 197, relay contacts 193 and 195, conductor 199, rectifier 200, conductor 202 for effecting energization of the relay winding 204 of relay 206.

Energization of the relay winding 204 will in turn close the relay contacts 210 and 216; 212 and 218; and 214 and 220. No electric power, however, may be applied through the closed relay contacts 214 and 220 to the relay winding 241 of relay 231 so long as negative or vacuum pressure is called for by the closure of contacts 109 and 112 and until the control arm 106 is rotated by the motor 98 in an opposite counterclockwise direction to correct for a resulting negative pressure overshoot causing contact arm 109 to once again close contact 110. This last condition will take place after sufficient vacuum or negative pressure has been applied to the diaphragm assembly or aneroid 83 at which time the inherent lag of the mechanical system will cause the control system to overshoot and apply a greater negative pressure than required to attain the selected pressure.

Upon the control arm 106 being rotated by the motor 98 in a counterclockwise direction so as to cause the contact arm 109 to close the contact 110 electric power is directed through the contact arms 109 and 110, electrical conductors 142 and 233, closed relay contacts 214 and 220, electrical conductor 235, rectifier 237 and conductor 239 for effecting energization of the relay winding 241 of relay 231.

Energization of the relay winding 241 will in turn close the relay contacts 250 and 252; and 229 and 254 respectively. No electric power, however, may be applied through the closed relay contacts 229 and 254 to the relay winding 270 of relay 272 so long as positive pressure is called for by the closure of the contacts 109 and 110 and until the control arm 106 is rotated in an opposite clockwise direction to correct for a resulting positive pressure overshoot causing contact arm 109 to once again close contact 112.

Upon the control arm 106 being rotated by the motor 98 in a clockwise direction so as to cause the contact arm 109 to close the contact 112 electric power is directed through the contact arms 109 and 112, electrical conductors 170 and 197, closed contacts 193 and 195 of relay 143; conductors 199 and 225; closed contacts 212 and 218 of relay 206; conductor 227; closed contacts 229 and 254 of relay 231, and conductor 264, rectifier 266 and conductor 268 to effect energization of the relay winding 270 of relay 272.

Energization of the relay winding 270 will in turn close the relay contacts 280 and 282 and open the relay contacts 180 and 284; and 150 and 286 respectively. The relay 272 in such energized condition thus opens the ground circuit for the solenoids 144 and 174 controlling the valve 155 for the positive pressure large bleed orifice and the valve 185 for the negative pressure large bleed orifice. In so doing, vacuum or negative pressure applied to the diaphragm assembly 83 may thereafter be directed solely through the small bleed orifice controlled by valve 186 instead of the negative pressure being applied through both the large bleed valve 185 and the small bleed valve 186. The slow application of negative pressure through the small orifice of the bleed valve 186 or subsequent slow application of positive pressure through the small orifice of the bleed valve 156 in either regulatory action provides sufficient time for the mechanical switch mechanism 108 to return to the off or null position without overshooting. The system can be made to operate as fast as required by the use of a larger orifice in valves 155 and 185. Additional relays can be added in cascade for still further speed of operation of the multivalve regulator 147.

The rectifiers 200, 237 and 266 serve to direct D.C. current from the battery 134 through the coils of their respective relays 206, 231 and 272 while preventing a reverse flow of current therethrough from the respective relay holding circuits and which reverse current, were it not for the rectifiers 200, 237 and 266, would effect improper energization of the solenoid windings 144, 146, 174 and 176. Further, the rectifiers 300 and 302 may be germanium diodes serving to direct D.C. current from the battery 134 to the winding 306 of the relay 308 whenever the contact switch element 109 closes either the contact element 110 or the contact element 112. The rectifiers 300 and 302 serve to prevent a reverse flow of current therethrough from the line 142 to the line 170 or vice versa and which reverse current were it not for the rectifiers 300 and 302 would effect improper energization of the solenoid windings 144, 146, 174 and 176.

When the switch contact 109 is in the neutral position, relay winding 306 is effectively deenergized so as to release the relay switch 312 and permit the same to close the contact 314 whereupon the relay 308 completes a D.C. circuit to a thermal relay 319 which after a predetermined delay period (i.e. a delay period greater than the transition period of the switch element 109 between the switch elements 110 and 112 during the normal regulatory operation) is effective to complete a D.C. circuit for energizing the light 320 to indicate that the selected pressure has been attained.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A fluid pressure test apparatus comprising a test chamber, a first source of positive fluid pressure medium, a second source of negative fluid pressure medium, a multivalve regulating means for operatively connecting said first and second sources to said test chamber, means for controlling said multivalve regulating means so as to effect a preselected fluid pressure value within said test chamber, said multivalve regulating means including first and second valve elements having relatively large valve orifices for selectively connecting said first and second fluid pressure sources respectively to said test chamber so as to cause a relatively rapid change in the fluid pressure effective therein, said multivalve regulating means further including third and fourth valve elements having relatively small valve orifices for selectively connecting said first and second fluid pressure sources respectively to said test chamber so as to cause a relatively slow change in the effective fluid pressure, said control means including first means to selectively operate said first and third valve elements and said second and fourth valve elements, and second means conditioned by operation of said first means in opposite senses for rendering said first means ineffective to operate said first and second valve elements, said first means being thereafter effective to selectively operate said third and fourth valve elements so as to accurately regulate the fluid pressure applied within the test chamber to the preselected value.

2. The combination defined by claim 1 including a time delay relay means, operator-operative means to initiate operation of the time delay relay means, and other relay means sequentially operated by the time delay relay means and the operation of said first means in said opposite senses to render said first means ineffective to operate said first and second valve elements.

3. A fluid pressure test apparatus comprising a test chamber, a first source of positive fluid pressure medium, a second source of negative fluid pressure medium, a multivalve regulating means for operatively connecting said first and second sources to said test chamber, means for controlling said multivalve regulating means so as to effect a preselected fluid pressure value within said test chamber, said multivalve regulating means including first and second valve elements having relatively large valve orifices for selectively connecting said first and second fluid pressure sources respectively to said test chamber so as to cause a relatively rapid change in the fluid pressure effective therein, said multivalve regulating means further including third and fourth valve elements having relatively small valve orifices for selectively connecting said first and second fluid pressure sources respectively to said test chamber so as to cause a relatively slow change in the effective fluid pressure and thereby regulate the fluid pressure applied within the test chamber to the preselected value, said control means including first means to selectively operate said first and third valve elements and said second and fourth valve elements, and second means conditioned by overcontrol operations of said first means in opposite senses for rendering said first means ineffective to operate said first and second valve elements, said first means being thereafter effective to selectively operate said third and fourth valve elements independently of said first and second elements, means responsive to the fluid pressure within the test chamber, said fluid pressure responsive means including first and second members movable relative one to the other, said first member being movable by said pressure responsive means in accordance with the fluid pressure in said test chamber, operator-operative means to effectively position said second member in accordance with the value of the selected fluid pressure within said test chamber, means for producing a signal the magnitude of which is in accordance with the difference in position existing between said two members, motor means for operatively positioning the first means to selectively operate the valve elements of the multivalve regulating means, means operatively connecting said signal producing means to said motor means to control said motor means in accordance with said differential signal, and said differential signal causing operation of the motor means and thereby operation of the multivalve regulating means through the first means of said control means in a sense such that the pressure within the test chamber will be so changed as to cause said first member to be adjustably positioned by said pressure responsive means relative to said second member so as to tend to nullify said differential signal.

4. A fluid pressure test apparatus comprising a test chamber, a first source of positive fluid pressure medium, a second source of negative fluid pressure medium, a multivalve regulating means for operatively connecting said first and second sources to said test chamber, means for controlling said multivalve regulating means so as to effect a preselected fluid pressure value within said test chamber, said multivalve regulating means including first and second valve elements having relatively large valve orifices for selectively connecting said first and second fluid pressure sources respectively to said test chamber so as to cause a relatively rapid change in the fluid pressure effective therein, said multivalve regulating means further including third and fourth valve elements having relatively small valve orifices for selectively connecting said first and second fluid pressure sources respectively to said test chamber so as to cause a relatively slow change in the effective fluid pressure and thereby regulate the fluid pressure applied within the test chamber to the preselected value, said control means including means to selectively operate said first and third valve elements and said second and fourth valve elements, means responsive to the fluid pressure within the test chamber, said fluid pressure responsive means including first and second members movable relative one to the other, said first member being movable by said pressure responsive means in accordance with the fluid pressure in said test chamber, operator-operative means to effectively position said second member in accordance with the value of the selected fluid pressure within said test chamber, means for producing a signal the magnitude of which is in accordance with the difference in position existing between said two members, motor means for operatively positioning the control means for the multivalve regulating means, means operatively connecting said signal producing means to said motor means to control said motor means in accordance with said differential signal, said differential signal causing operation of the motor means and thereby operation of the multivalve regulating means in a sense such that the pressure within the test chamber will be so changed as to cause said first member to be adjustably positioned by said pressure responsive means relative to said second member so as to tend to nullify said differential signal, time delay relay means, operator-operative means to initiate operation of the time delay relay means, other relay means to render said control means ineffective to operate said first and second valve elements, said other relay means including a first relay rendered effective by said time delay relay means after a predetermined delay period and upon the positioning of said control means in one sense by said motor means to a first position, a second relay rendered effective by said first relay upon the positioning of said control means in an opposite sense by said motor means to a second position, a third relay rendered effective by said second relay upon the motor means repositioning said control means in said one sense to said first position, and means rendered effective by said third relay to render said control means ineffective to selectively operate said first and second valve elements so that thereafter said control means is effective through said selective means to operate said third and fourth valve elements independently of said first and second valve elements and thereby regulate the fluid pressure within the test chamber to the preselected value.

5. A test apparatus comprising a test chamber, fluid pressure regulating valve means having first and second fluid pressure conduits for conducting a gaseous medium to and from said valve means and a third pressure conduit connecting said valve means to said test chamber, fluid pressure responsive means sensitive to the pressure of the gaseous medium in said test chamber, said fluid pressure responsive means for operating in opposite senses said control means and thereby said valve means so as to selectively connect said first and second conduits to said third conduit to regulate the pressure of the gaseous medium in said test chamber to a predetermined value, said valve means including first bleed means operable for changing the pressure of the gaseous medium in said test chamber at such a rapid rate as to tend to cause the regulated pressure to alternate about the predetermined regulated value, and second bleed means operable for changing the pressure of the gaseous medium in said test chamber at a relatively slow rate, and means responsive to the operation of said control means for rendering the first bleed means inoperative after a predetermined sequence of operation of the control means in said opposite senses whereupon the operation of said valve means so as to regulate the pressure of the gaseous medium in said test chamber to the predetermined value is effected through said second bleed means.

6. A test apparatus comprising a test chamber, fluid pressure regulating valve means having first and second fluid pressure conduits for conducting a gaseous medium to and from said valve means and a third pressure conduit connecting said valve means to said test chamber, fluid pressure responsive means sensitive to the pressure of the gaseous medium in said test chamber, said fluid pressure responsive means for operating in opposite senses said control means and thereby said valve means so as to selectively connect said first and second conduits to said third conduit as to regulate the pressure of the gaseous medium in said test chamber to a predetermined value, said valve means including first bleed means operable for changing the pressure of the gaseous medium in said test chamber at such a rapid rate as to tend to cause the regulated pressure to alternate about the predetermined regulated value, and second bleed means operable for changing the pressure of the gaseous medium in said test chamber at a relatively slow rate, and relay means responsive to a predetermined sequence of operation of the control means in said opposite senses for rendering the first bleed means inoperative whereupon the operation of said valve means so as to regulate the pressure of the gaseous medium in said test chamber to the predetermined value is thereafter effected through said second bleed means.

7. The combination defined by claim 6 including operator-operative means for initiating operation of the control means, and time delay means effective after the initiation of operation of the control means and a delay period to render the relay means operative in response to the predetermined sequence of operation of said control means.

8. A test apparatus comprising a test chamber, fluid pressure regulating valve means having first and second fluid pressure conduits for conducting a gaseous medium to and from said valve means and a third pressure conduit connecting said valve means to said test chamber, fluid pressure responsive means sensitive to the pressure of the gaseous medium in said test chamber, said fluid pressure responsive means for operating in opposite senses said control means and thereby said valve means so as to selectively connect said first and second conduits to said third conduit to regulate the pressure of the gaseous medium in said test chamber to a predetermined value, said valve means including first and second solenoid operated bleed valves for selectively connecting said first and second conduits to said third conduit through relatively large bleed orifices for changing the pressure of the gaseous medium in said test chamber at such a rapid rate as to tend to cause the regulated pressure to alternate about the predetermined regulated value, and third and fourth solenoid operated bleed valves for selectively connecting said first and second conduits to said third conduit through relatively small bleed orifices for changing the pressure of the gaseous medium in said test chamber at a relatively slow rate, said control means including switch means operably positioned by said fluid pressure responsive means in opposite senses, first circuit means controlled by said switch means for effectively energizing said first and third solenoid operated bleed valves in one position of said switch means, second circuit means controlled by said switch means for effectively energizing said second and fourth solenoid operated bleed valves in an opposite position of said switch means, and relay means responsive to a predetermined sequence of control of said first and second circuit means by said switch means for rendering the first and second circuit means ineffective to energize said first and second solenoid operated bleed valves whereupon regulation of the pressure of the gaseous medium in said test chamber to the predetermined value is thereafter effected by the energization of said third and fourth solenoid operated bleed values by said first and second circuit means selectively controlled by the positioning of said switch means.

9. The combination defined by claim 8 including operator-operative means for initiating operation of the control means, and time delay means for rendering the relay means ineffective for a predetermined delay period after the initiation of operation of said control means, and said time delay means being so arranged that upon expiration of said delay period said relay means is rendered effective.

References Cited in the file of this patent
UNITED STATES PATENTS 1,570,300    Gase  ------------------ Jan. 19, 1926
2,893,236    Coon et al. -------------- July 7, 1959